United States Patent
Tu et al.

(10) Patent No.: US 12,432,494 B2
(45) Date of Patent: Sep. 30, 2025

(54) AUDIO PARAMETER SETTING METHOD AND ELECTRONIC DEVICE

(71) Applicant: Acer Incorporated, New Taipei (TW)

(72) Inventors: Po-Jen Tu, New Taipei (TW);
Kai-Meng Tzeng, New Taipei (TW);
Jia-Ren Chang, New Taipei (TW)

(73) Assignee: Acer Incorporated, New Taipei (TW)

( * ) Notice: Subject to any disclaimer, the term of this patent is extended or adjusted under 35 U.S.C. 154(b) by 274 days.

(21) Appl. No.: 18/366,697

(22) Filed: Aug. 8, 2023

(65) Prior Publication Data
US 2024/0388847 A1 Nov. 21, 2024

(30) Foreign Application Priority Data
May 16, 2023 (TW) .................. 112118171

(51) Int. Cl.
*H04R 3/04* (2006.01)
*G06N 3/045* (2023.01)

(52) U.S. Cl.
CPC ............... *H04R 3/04* (2013.01); *G06N 3/045* (2023.01); *H04R 2430/01* (2013.01)

(58) Field of Classification Search
CPC .... H04R 3/04; H04R 2430/01; H04R 29/008; H04R 29/001; G06N 3/045; G06N 3/08; H03G 5/025
USPC ......... 381/56, 59, 96, 98, 99, 103; 333/28 R
See application file for complete search history.

(56) References Cited

U.S. PATENT DOCUMENTS

| | | | | |
|---|---|---|---|---|
| 9,544,172 | B2 * | 1/2017 | Terada | H03G 5/005 |
| 10,806,380 | B2 * | 10/2020 | Clark | H03G 9/025 |
| 11,019,439 | B2 * | 5/2021 | Tu | G01R 23/163 |
| 2004/0146170 | A1 * | 7/2004 | Zint | H03G 5/04 381/103 |
| 2006/0291670 | A1 * | 12/2006 | King | H03G 5/025 381/103 |
| 2008/0273747 | A1 | 11/2008 | Rhoads | |
| 2009/0169025 | A1 * | 7/2009 | Chen | H04R 3/04 381/59 |
| 2024/0276148 | A1 * | 8/2024 | Wang | H04R 3/04 |

FOREIGN PATENT DOCUMENTS

| | | |
|---|---|---|
| CN | 101438259 | 5/2009 |
| CN | 110326308 | 10/2019 |
| CN | 113614684 | 11/2021 |
| CN | 114974188 | 8/2022 |
| TW | 493161 | 7/2002 |
| TW | 201713033 | 4/2017 |
| TW | I579834 | 4/2017 |

* cited by examiner

*Primary Examiner* — Xu Mei
(74) *Attorney, Agent, or Firm* — JCIPRNET

(57) ABSTRACT

An audio parameter setting method and an electronic device are provided. In the method, a sound signal played by the speaker device is obtained. A frequency response curve of the sound signal is generated. The frequency response curve of the sound signal is smoothed to obtain a smoothed response curve of the sound signal. A target frequency response curve is determined according to the sound signal. Multiple turning points of the smoothed response curve of the sound signal are detected by using a neural network model. Equalizer parameters are determined according to the multiple turning points of the smoothed response curve and the target frequency response curve.

16 Claims, 5 Drawing Sheets

AUDIO PARAMETER SETTING METHOD AND ELECTRONIC DEVICE

CROSS-REFERENCE TO RELATED APPLICATION

This application claims the priority benefit of Taiwan application serial no. 112118171, filed on May 16, 2023. The entirety of the above-mentioned patent application is hereby incorporated by reference herein and made a part of this specification.

BACKGROUND

Technical Field

The disclosure relates to an audio signal processing, and especially relates to an audio parameter setting method and an electronic device.

Description of Related Art

A smart speaker may receive an audio signal over the Internet or from mobile electronic devices. After the smart speaker decodes the audio signal and performs sound processing, music may be played. Generally speaking, in an audio processing process, one or more frequency bands of a sound signal may be gained or attenuated by adjusting equalizer parameters, so as to achieve the purpose of adjusting the timbre.

However, at present, the setting of the equalizer parameters of the smart speaker is mostly done manually, which is still inconvenient for ordinary users, and it is not sure how to adjust the equalizer parameters to a suitable status.

SUMMARY

Embodiments of the disclosure provide an audio parameter setting method and an electronic device, which can solve the above technical problems.

The audio parameter setting method of the embodiment of the disclosure includes (but not limited to) the following. A sound signal played by a speaker device is obtained. A frequency response curve of the sound signal is generated. The frequency response curve of the sound signal is smoothed to obtain a smoothed response curve of the sound signal. A target frequency response curve is determined according to the sound signal. Multiple turning points of the smoothed response curve of the sound signal are detected by using a neural network model. Equalizer parameters are determined according to the multiple turning points of the smoothed response curve and the target frequency response curve.

The electronic device in the embodiments of the disclosure includes (but not limited to) a storage device and a processor. The storage device is configured to store multiple modules. The processor is coupled to the storage device, accessing the multiple modules and configured to execute the following. A sound signal played by a speaker device is obtained. A frequency response curve of the sound signal is generated. The frequency response curve of the sound signal is smoothed to obtain a smoothed response curve of the sound signal. A target frequency response curve is determined according to the sound signal. Multiple turning points of the smoothed response curve of the sound signal are detected by using a neural network model. Equalizer parameters are determined according to the multiple turning points of the smoothed response curve and the target frequency response curve.

Based on the above, in the embodiment of the disclosure, the neural network model can be used to detect the multiple turning points of the smoothed response curve of the sound signal, so as to determine the equalizer parameters according to the frequency difference between the multiple turning points and the target frequency response curve. In this way, by automatically generating and applying the equalizer parameters, the audio distortion caused by the mechanical design of the speaker device can be compensated to improve the audio quality.

In order to make the above-mentioned features and advantages of the disclosure comprehensible, the following embodiments are described in detail together with the accompanying drawings.

DESCRIPTION OF THE EMBODIMENTS

Figure 1:
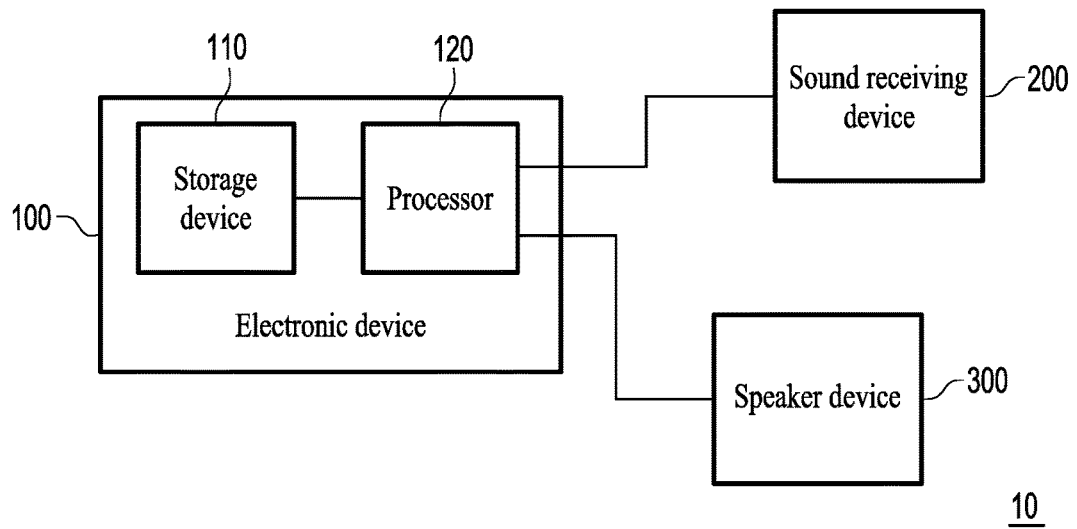
FIG. 1 is a block diagram of an audio parameter setting system according to an embodiment of the disclosure.

Parts of the embodiments of the disclosure will be described in detail with reference to the accompanying drawings. For the referenced reference numerals in the following description, the same reference numerals appear in different drawings will be regarded as the same or similar components. The embodiments are only a part of the disclosure, and do not reveal all possible implementations of the disclosure. Rather, the embodiments are only examples of methods and apparatus within the scope of the disclosure.

FIG. 1 is a block diagram of an audio parameter setting system according to an embodiment of the disclosure. An audio parameter setting system 10 includes an electronic device 100, a sound receiving device 200, and a speaker device 300.

In some embodiments, the audio parameter setting system 10 may be integrated into a single electronic device, such as a smart speaker, a laptop computer, a smart phone, or a tablet computer. Alternatively, in some embodiments, the audio parameter setting system 10 may be realized by multiple electronic devices. For example, the speaker device 300 is a smart speaker built with the sound receiving device 200, and the smart speaker may be connected to the electronic device

100. Alternatively, the speaker device 300 is a smart speaker, and the smart speaker may be connected to the electronic device 100 built in with the sound receiving device 200. Still alternatively, the sound receiving device 200 and the speaker device 300 may be connected to the electronic device 100 through a wired/wireless transmission interface. The electronic device 100 may be a computer device with computing capabilities such as a desktop computer, a laptop computer, and an AIO computer.

The electronic device 100 includes a storage device 110 and a processor 120. The storage device 110 may be any type of fixed or removable random access memory (RAM), read only memory (ROM), flash memory, hard disk drive (HDD), solid-state drive (SSD), or similar components. In an embodiment, the storage device 110 is configured to record program codes, software modules, configurations, data, or files (e.g., sound signals, sound features, data sets, and model parameters), which will be described in detail in subsequent embodiments.

The processor 120 is coupled to the storage device 110. The processor 120 may be a central processing unit (CPU), a graphic processing unit (GPU), or other programmable general purpose or special purpose microprocessors, a digital signal processor (DSP), a programmable controller, a field programmable gate array (FPGA), an application-specific integrated circuit (ASIC), a neural network accelerator, or other similar components or a combination of the above components. In an embodiment, the processor 120 is configured to execute all or part of operations of the electronic device 100, and may access and execute software modules, files, and/or data stored in the storage device 110. The software modules may be broadly interpreted to mean commands, command sets, codes, program codes, programs, application programs, software packages, threads, procedures, functions, etc., regardless of whether to be referred to as software, firmware, intermediate software, microcode, hardware description language, or others.

The sound receiving device 200 may be a microphone (types such as dynamic, condenser, or electret condenser). The speaker device 300 has a speaker driver which may be configured to play sound signals. The sound receiving device 200 is configured to receive the sound signal played by the speaker device 300.

In some embodiments, the electronic device 100 may determine equalizer parameters suitable for the speaker device 300 according to the sound signal played by the speaker device 300. The electronic device 100 may provide the equalizer parameters to a digital audio processor of the speaker device 300, so that the speaker device 300 may adjust a frequency response of an audio signal according to the equalizer parameters.

In the following, a method described in the embodiments of the disclosure will be described in combination with various components, modules, and signals in the audio parameter setting system 10. Each process of the method may be adjusted accordingly according to the implementation situation, and is not limited thereto.

Figure 2:
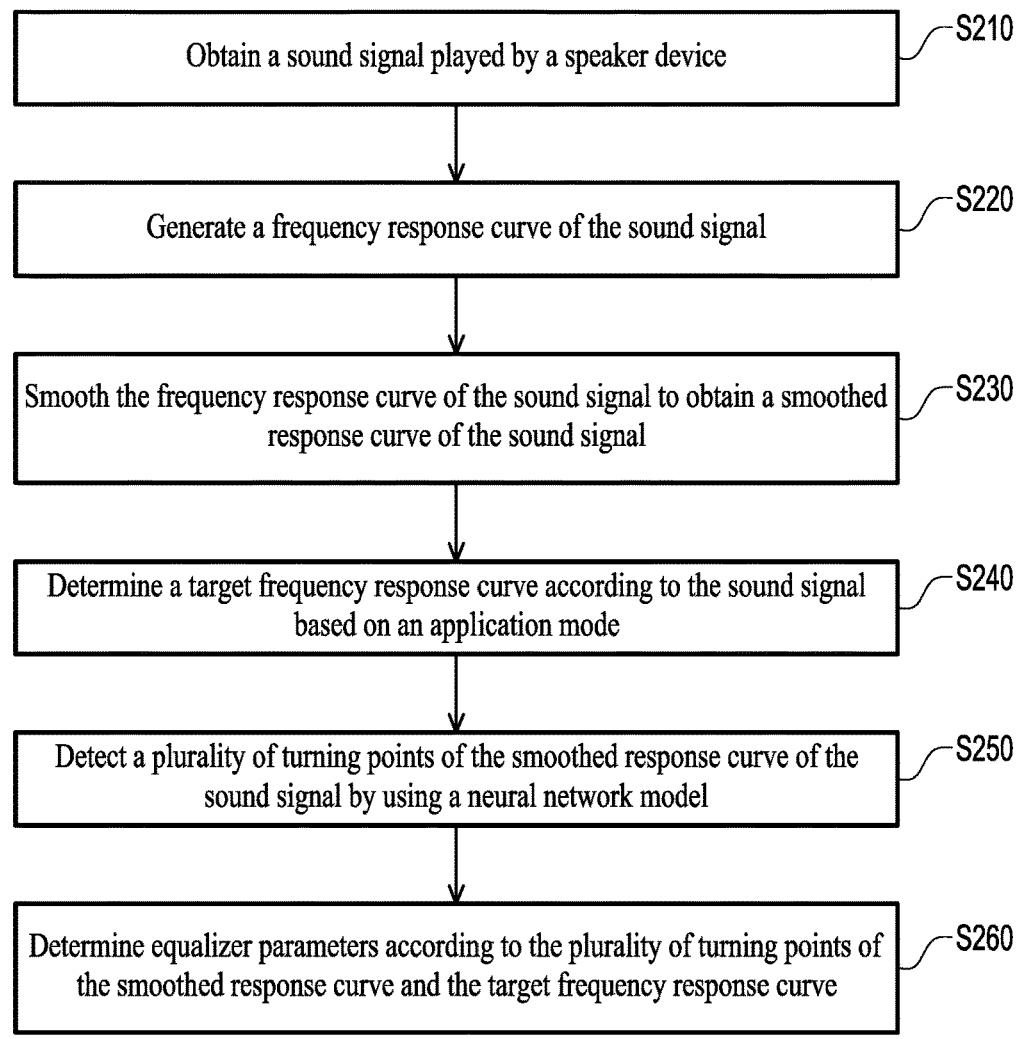
FIG. 2 is a flowchart of an audio parameter setting method according to an embodiment of the disclosure.

FIG. 2 is a flowchart of an audio parameter setting method according to an embodiment of the disclosure. Please refer to FIG. 2. In Step S210, the processor 120 obtains the sound signal played by the speaker device 300 through the sound receiving device 200. The sound signal includes human voice, music, animal sound, environmental sound, machine operation sound, synthetic sound, or a combination thereof, and the disclosure is not limited thereto. For example, the processor 120 obtains a white noise signal or a pink noise signal played by the speaker device 300 through the sound receiving device 200.

In Step S220, the processor 120 generates a frequency response curve of the sound signal. Specifically, the processor 120 may convert the sound signal from the time domain to the frequency domain by using Fast Fourier Transform (FFT) to obtain a frequency response curve of the sound signal.

In Step S230, the processor 120 smoothes the frequency response curve of the sound signal to obtain a smoothed response curve of the sound signal. In some embodiments, the processor 120 may perform moving average processing on the frequency response curve of the sound signal to obtain a smoothed response curve. In some embodiments, the processor 120 may generate a smoothed response curve according to the following Formulas (1) and (2).

$$\overline{P_k} = \frac{1}{2N_k + 1} \sum_{-N_k}^{N_k} P_k \qquad \text{Formula (1)}$$

$$N_k = \frac{\alpha f_k}{2\Delta f_s} \qquad \text{Formula (2)}$$

$P_k$ is the power of frequency $f_k$; $N_k$ is a value proportional to the frequency $f_k$; $\alpha$ is a smoothing coefficient, which may, for example, be set to 0.1; $\Delta f_s$ is a sampling frequency interval.

Figure 3:
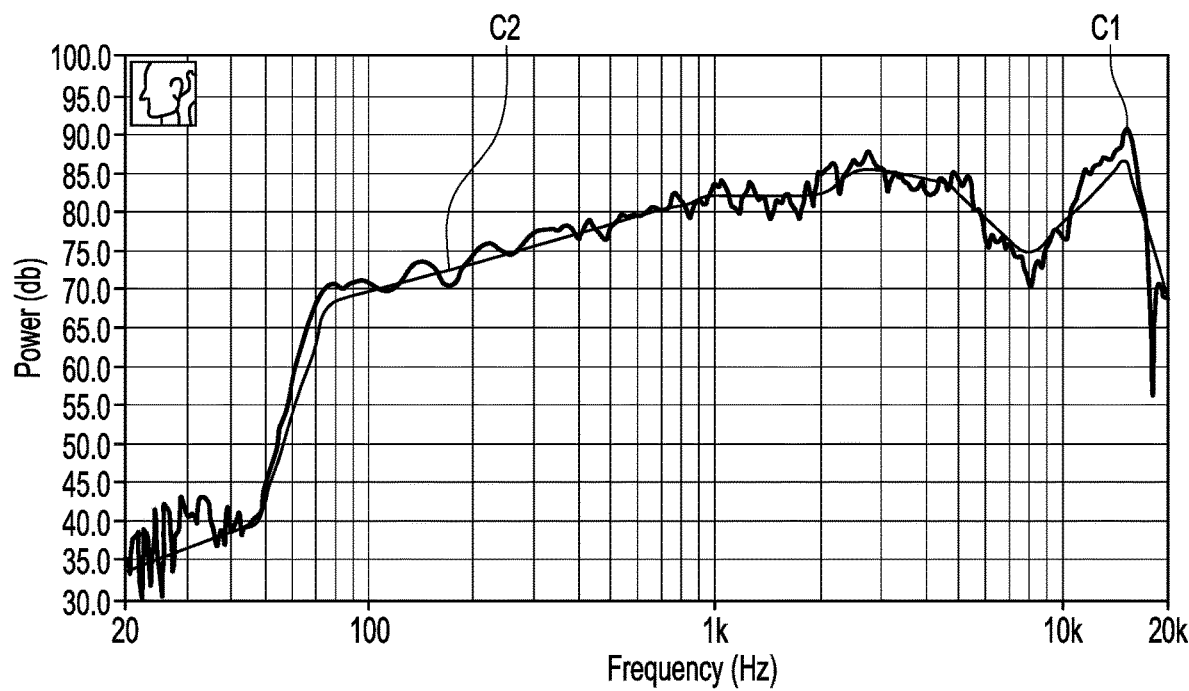
FIG. 3 is a schematic diagram illustrating generating a smoothed response curve according to an embodiment of the disclosure.

For example, FIG. 3 is a schematic diagram illustrating generating a smoothed response curve according to an embodiment of the disclosure. The processor 120 may smooth a frequency response curve C1 of the sound signal to obtain a smoothed response curve C2 of the sound signal. As shown in FIG. 3, the smoothed response curve C2 is smoother than the frequency response curve C1.

In Step S240, the processor 120 determines a target frequency response curve according to the sound signal based on an application mode. The target frequency response curve corresponds to an adjustment frequency range, and a lower limit frequency and an upper limit frequency of the adjustment frequency range may be set according to actual applications. In some embodiments, when the application mode is a specific music mode, the processor 120 may calculate an average root mean square (RMS) power of the sound signal, and set the target frequency response curve according to the average RMS power of the sound signal. That is, when the application mode is a specific music mode, the target frequency response curve may be a straight line. In some embodiments, when the application mode is an audio adjustment mode, the processor 120 may directly set a high frequency part of the target frequency response curve as the average RMS power of the sound signal, and generate a low frequency part of the target frequency response curve according to another smoothed response curve of the sound signal. That is, when the application mode is an audio adjustment mode, the target frequency response curve may be a turning line having a turning point.

Figure 4:
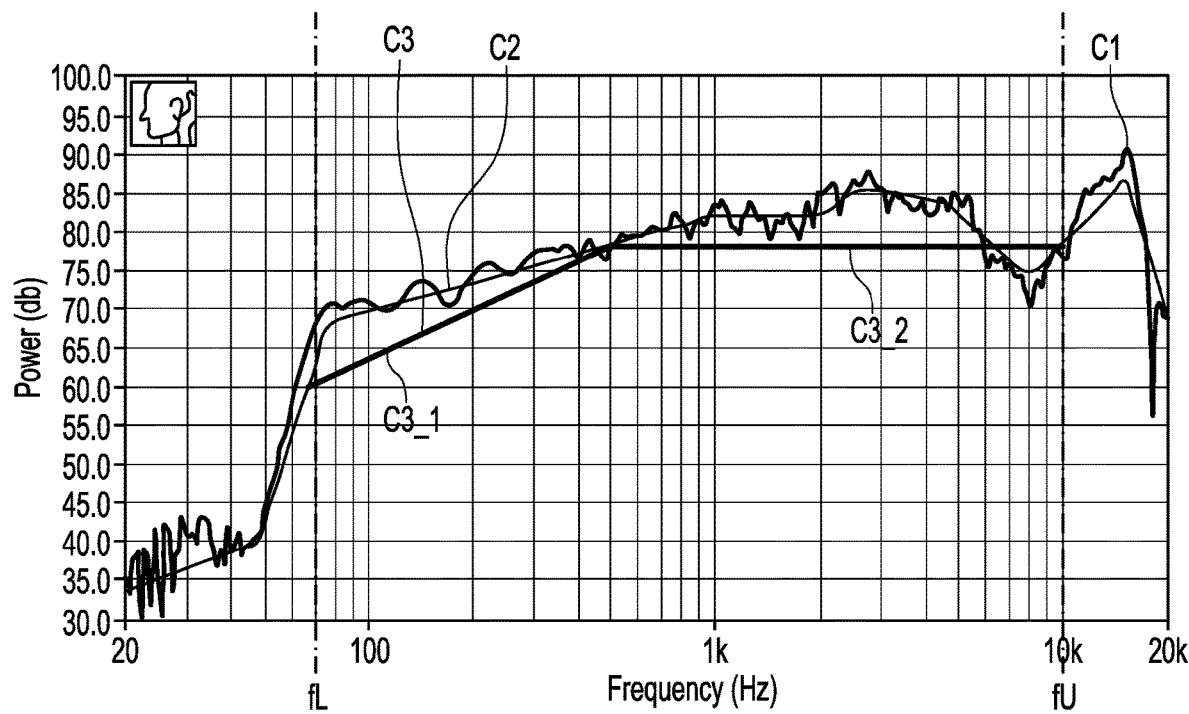
FIG. 4 is a schematic diagram illustrating determining a target frequency response curve according to an embodiment of the disclosure.

In detail, FIG. 4 is a schematic diagram illustrating determining a target frequency response curve according to an embodiment of the disclosure. Referring to FIG. 4, the processor 120 may set a lower limit frequency fL and an upper limit frequency fU of a target frequency response curve C3. For example, considering the characteristics of a speaker driver and the hearing characteristics of the human ear, the lower limit frequency fL may be 70 Hz and the upper limit frequency fU may be 10000 Hz. Audio components lower than 70 Hz may easily cause damage to the speaker driver, and audio components higher than 10,000 Hz are not easily detectable by the human ear. In addition, the processor 120 may use the average RMS power of the sound signal to determine a high frequency part C3_2 of the target frequency response curve C3. Specifically, the processor 120 may calculate the average RMS power of the sound signal, and directly set the high frequency part C3_2 of the target frequency response curve C3 as the average RMS power of the sound signal. Moreover, the processor 120 may use a low frequency part of another smoothed response curve of the sound signal to determine a low frequency part C3_1 of the target frequency response curve C3. For example, when generating the smoothed response curve C2 according to the Formulas (1) and (2), the processor 120 may set the smoothing coefficient to 0.1. Moreover, the processor 120 may set the smoothing coefficient to 0.5 to generate another smoothed response curve, and set a low frequency part of the other smoothed response curve as the low frequency part C3_1 of the target frequency response curve C3.

It should be noted that the definition of the target frequency response curve C3 shown in FIG. 4 is based on compensating the performance of the speaker device 300. In other embodiments, when adjusting the sound effect of music of a specific music genre, the processor 120 may set the entire target frequency response curve according to the average RMS power of the sound signal, that is, the target frequency response curve is a straight line having no turning point.

Next, in Step S250, the processor 120 detects multiple turning points of the smoothed response curve of the sound signal by using a neural network model. The neural network model may be a convolutional neural network (CNN) model. In some embodiments, the neural network model is, for example, a U-net model including an encoder layer and a decoder layer. By using a neural network model having a peak value detection capability, the processor 120 may detect the multiple turning points of the smoothed response curve. According to input data, the neural network model may output a peak value position (i.e. a turning frequency). In an embodiment, the neural network model may be trained according to multiple groups of pulse wave signals mixed with noise and marked peak value positions. The input data of the neural network model can be a one-dimensional matrix including multiple data points.

In some embodiments, the processor 120 may calculate difference data between the smoothed response curve and the target frequency response curve. The difference data may be a one-dimensional matrix including multiple frequency differences, and the multiple frequency differences correspond to multiple frequency positions respectively. By subtracting power values corresponding to the same frequency position on the smoothed response curve and the target frequency response curve, the processor 120 may obtain frequency differences corresponding to different frequency positions. The processor 120 may input the difference data into the neural network model, so that the neural network model may output a turning frequency of each turning point. That is, the multiple turning points on the smoothed response curve correspond to the multiple turning frequencies respectively.

Figure 5:
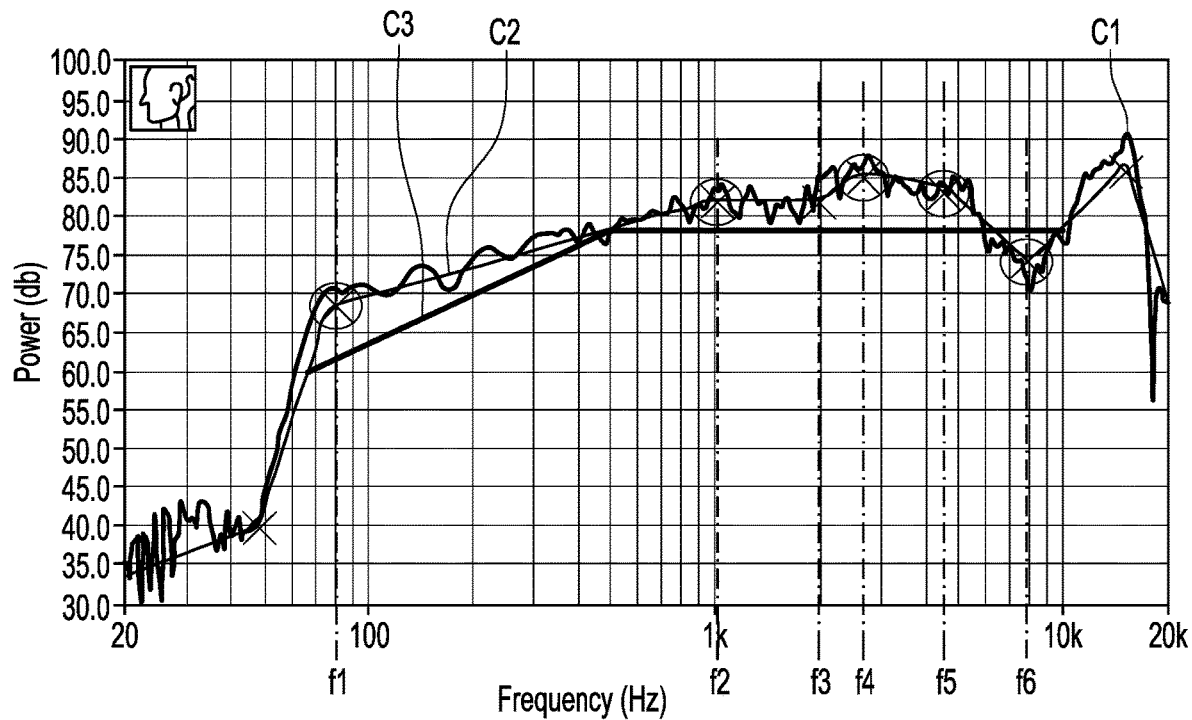
FIG. 5 is a schematic diagram illustrating determining a center frequency according to a turning point of a smoothed response curve according to an embodiment of the disclosure.

For example, FIG. 5 is a schematic diagram illustrating determining a center frequency according to a turning point of a smoothed response curve according to an embodiment of the disclosure. Referring to FIG. 5, the processor 120 may calculate the difference data between the smoothed response curve C2 and the target frequency response curve C3, and the difference data may be frequency differences corresponding to different frequency positions. Assuming that the adjustment frequency range of the target frequency response curve C3 includes M sampling points, the processor 120 may input a one-dimensional matrix including M frequency differences into the neural network model, so that the neural network model detects multiple turning points on the smoothed response curve C2. In this example, the turning points correspond to turning frequencies f1 to f6 respectively.

Afterward, in Step S260, the processor 120 determines equalizer parameters according to the multiple turning points of the smoothed response curve and the target frequency response curve. In some embodiments, the equalizer parameters include multiple center frequencies, and multiple relative powers and multiple Q values respectively corresponding to the multiple center frequencies. In some embodiments, the equalizer parameters may be configured to determine the filtering characteristics of multiple infinite impulse response (IIR) filters configured to implement the equalizer.

In an embodiment, the processor 120 may obtain a lowest center frequency among the multiple center frequencies according to a lowest turning frequency among the multiple turning frequencies. Moreover, the processor 120 may set a filtering status of the lowest center frequency as high-pass filtering. Specifically, if the lowest turning frequency among the multiple turning frequencies is within a preset range, the processor 120 may directly set the filtering status of the lowest center frequency of the equalizer to high-pass filtering to filter out audio frequency components below the lowest center frequency. In this way, the speaker driver can be protected from being damaged by a low-frequency direct current.

In some embodiments, the processor 120 may calculate multiple power differences between the multiple turning points of the smoothed response curve and the target frequency response curve. The processor 120 may select multiple first turning frequencies from the multiple turning frequencies as the multiple center frequencies according to comparison results of the multiple power differences and frequency differences between the turning frequencies. The processor 120 determines multiple relative powers corresponding to the multiple center frequencies according to the multiple power differences corresponding to the multiple first turning frequencies.

For example, please refer to FIG. 5 again. After obtaining the turning points corresponding to the turning frequencies f1 to f6, the processor 120 may first set the lowest turning frequency among the turning frequencies f1 to f6 as the lowest center frequency among the multiple center frequencies. Afterward, the processor 120 calculates multiple power differences between the turning points corresponding to the turning frequencies f1 to f6 and the target frequency response curve. Afterward, the processor 120 may sort the multiple power differences, and preferentially select the turning frequency f4 corresponding to a largest power difference as one of the center frequencies. After that, the processor 120 may discard the turning frequency f3 which is too close to the turning frequency f4. Specifically, when the frequency difference between the turning frequency f4 and the turning frequency f3 is smaller than a threshold value, the processor 120 may discard the turning frequency f3. Next, the processor 120 finds another maximum power difference from the power difference corresponding to the remaining turning frequency that has not been discarded and is not selected as the center frequency, and may decide to use the turning frequency f5 corresponding to the other large power difference as one of the center frequencies. By analogy, the processor 120 may iteratively determine whether all turning frequencies may be used as the center frequency of the equalizer parameters. In this example, the processor 120 may select the turning frequencies f1, f2, f4, f5, and f6 (i.e. first turning frequency) as the multiple center frequencies.

Next, the processor 120 determines multiple relative powers corresponding to the multiple center frequencies according to the multiple power differences corresponding to the turning frequencies f1, f2, f4, f5, and f6 (i.e. the first turning frequency). In some embodiments, the multiple relative powers may be represented as $Y_m=\beta g_m$, in which $\beta=0.9$; $g_m$ represents a power difference at a certain center frequency between the smoothed response curve and the target frequency response curve. Alternatively, in some embodiments, the multiple relative powers may be represented as $Y_m=-\beta g_m$, in which $\beta=0.9$. In some embodiments, the relative power corresponding to each of the center frequencies is proportional to a gain value of the equalizer.

In some embodiments, the processor 120 may generate a virtual equalizer parameter curve according to the multiple center frequencies and the multiple corresponding relative powers. Specifically, the processor 120 may obtain the virtual equalizer parameter curve according to the connection of each center frequency and the corresponding relative power. The positivity and negativity of the relative power may be set according to actual needs. The processor 120 may determine multiple angles corresponding to the multiple center frequencies according to the virtual equalizer parameter curve. Therefore, the processor 120 may determine a Q value corresponding to each center frequency according to each angle. The Q value refers to a quality factor of the filter in the equalizer. The smaller the Q value, the wider the frequency band of the filter. Conversely, the larger the Q value, the narrower the frequency band of the filter.

Figure 6:
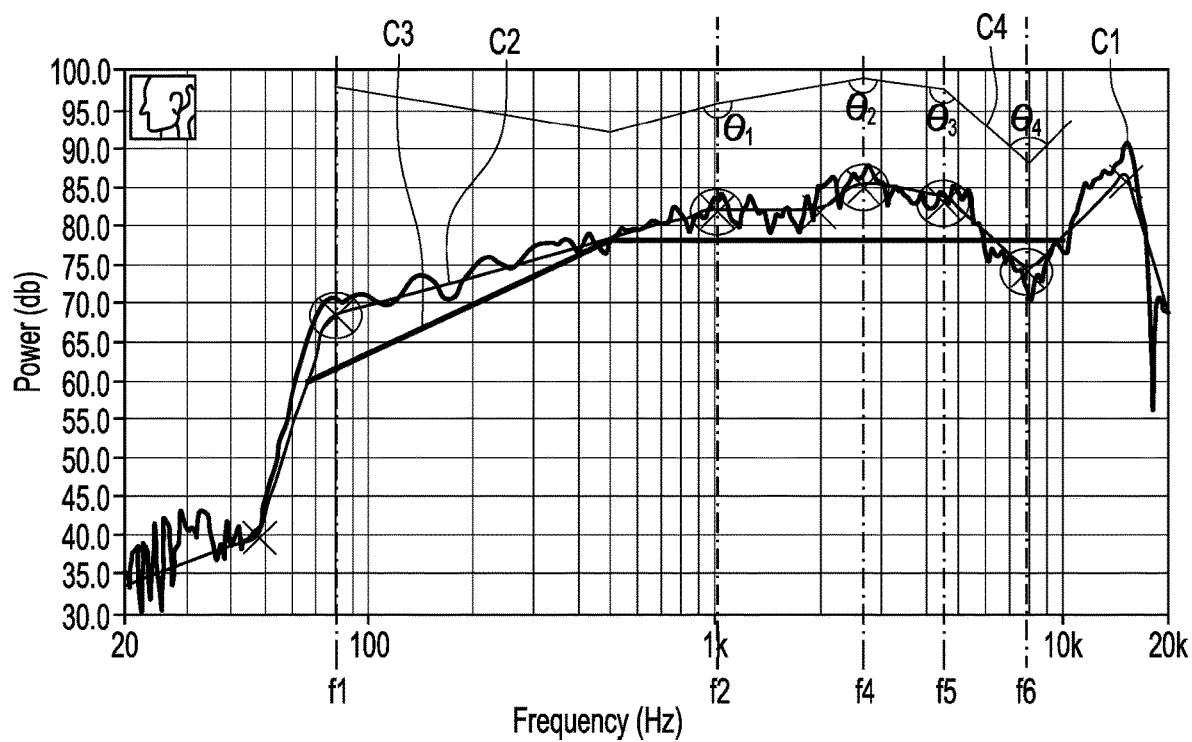
FIG. 6 is a schematic diagram illustrating determining a Q value according to an embodiment of the disclosure.

For example, FIG. 6 is a schematic diagram illustrating determining the Q value according to an embodiment of the disclosure. After selecting the turning frequency f1, f2, f4, f5, and f6 as the multiple center frequencies according to the example of FIG. 5, the processor 120 may generate a virtual equalizer parameter curve C4 according to the multiple center frequencies and corresponding relative power $Y_m$. The processor 120 may determine multiple angles θ1 to θ4 corresponding to multiple center frequencies on the virtual equalizer parameter curve C4. For example, the angle θ4 may be calculated according to three adjacent center frequencies (i.e. the turning frequencies f2, f4, and f5) and corresponding three relative powers. It may be known that the smaller the $\theta_m$, the narrower the frequency band $\Delta f_m$ of the filter. The larger the $\theta_m$, the wider the frequency band $\Delta f_m$ of the filter. Therefore, the processor 120 may calculate multiple Q values according to the following Formula (3).

$$Q_m = 1 + \sin^2\theta_m \quad \text{Formula (3)}$$

In this way, the processor 120 may generate the equalizer parameters including multiple center frequencies, multiple relative powers, and multiple Q values, so as to control the output sound effect of the speaker device 300.

In some embodiments, the processor 120 may also provide different equalizer parameters for different music genres. So that the user may control the speaker device 300 to play music according to the corresponding equalizer parameters by setting the music genre. In some embodiments, the sound signals include multiple first sound signals corresponding to a music genre, and the equalizer parameters generated according to the flow shown in FIG. 2 include multiple first equalizer parameters respectively corresponding to the multiple first sound signals. The processor 120 may learn the equalizer parameters suitable for different music genres through a machine learning model.

Figure 7:
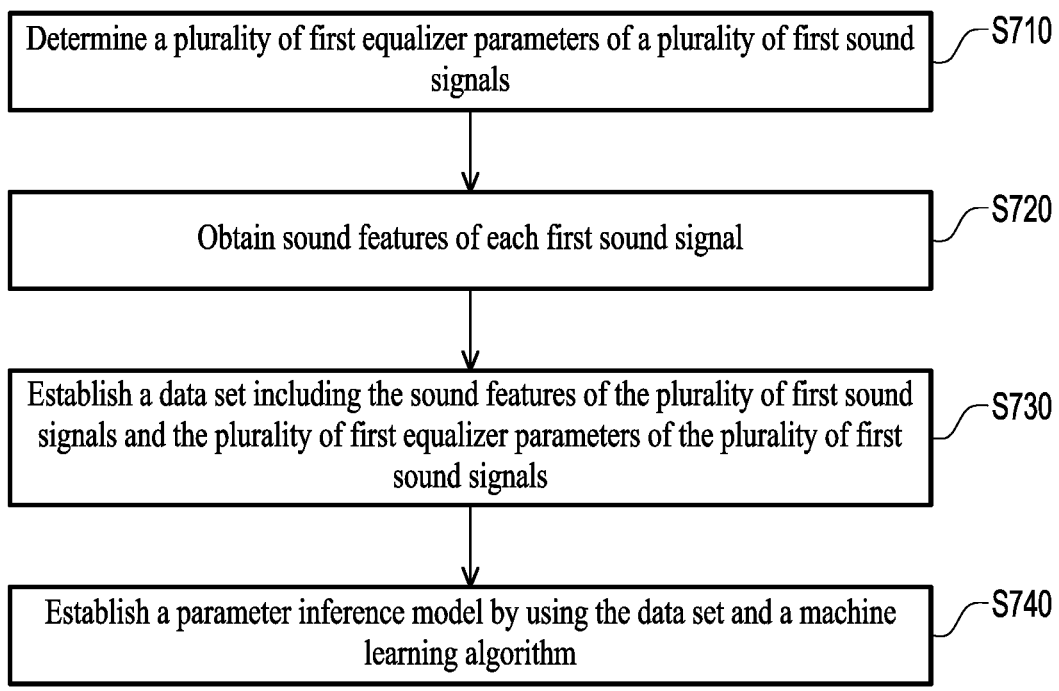
FIG. 7 is a flowchart of an audio parameter setting method according to an embodiment of the disclosure.

FIG. 7 is a flowchart of an audio parameter setting method according to an embodiment of the disclosure. Please refer to FIG. 7. In Step S720, the processor 120 determines the multiple first equalizer parameters of the multiple first sound signals. In detail, the multiple first sound signals belong to the same music genre. The music genre is, for example, jazz, rock, pop, or classical. The processor 120 may generate corresponding first equalizer parameters for each first sound signal according to the process and operation principle shown in FIG. 2. For example, by repeatedly executing the process shown in FIG. 2, the processor 120 may generate equalizer parameters corresponding to 100 jazz songs.

In Step S720, the processor 120 obtains sound features of each first sound signal. In an embodiment, the sound features include a peak value, a maximum RMS power, a minimum RMS power, an average RMS power, and/or spectral characteristics (for example, low, medium, and/or high frequencies). However, according to different design requirements, there are other variations in the type of sound features. For example, zero crossing Rate (ZCR), spectral centroid or spectral rolloff, or Mel Frequency Cepstral Coefficients (MFCCs). The processor 120 may obtain the sound features through a function or a feature extractor corresponding to each sound feature. For example, the processor 120 may generate the corresponding sound features of 100 jazz songs.

In Step S730, the processor 120 establishes a data set including the sound features of the first sound signals and the first equalizer parameters of the first sound signals. Specifically, the data set includes multiple data samples, and each data sample includes sound features of a first sound signal and corresponding first equalizer parameters. In some embodiments, the processor 120 may divide multiple data sets into training sets, validation sets, or test sets for use in different stages of subsequent model building. For example, a training set is a collection of data samples used to tune the parameters of a machine learning model. The validation set provides an unbiased evaluation of the model fit on the training set. Instead, the test set may be used to provide an unbiased evaluation of the final model.

In Step S740, the processor 120 establish a parameter inference model by using the data set and the machine learning algorithm, in which the parameter inference model is configured to determine optimized equalizer parameters for an input audio signal belonging to a music genre. For example, the processor 120 may use the sound features of 100 jazz songs and the corresponding equalizer parameters to train the parameter inference model. The parameter inference model is trained to learn the correlation between input sound features and optimized equalizer parameters for sound signals of the same music genre. The machine learning algorithm is, for example, a regression analysis algorithm or other machine learning algorithms. For example, the parameter inference model may be a regression model. The parameter inference model may generate corresponding optimized equalizer parameters according to the sound features of the input audio signal. Therefore, after the parameter inference model is generated, when the user sets the speaker device 300 to a jazz mode, the speaker device 300 or the electronic device 100 may use the parameter inference model to generate equalizer parameters suitable for jazz.

In an embodiment, the established data set includes a first data subset and a second data subset. In a first model training phase, the processor 120 may use the first data subset as a training set and the second data subset as a validation set. In a second model training phase, the processor 120 uses the second data subset as the training set and the first data subset as the validation set. Cross-validation (or circular estimation) is to analyze a part of the data set first, and other data sets are used as subsequent confirmation and validation of this analysis. The data set for the initial analysis is called the training set. The other data sets are called validation sets or test sets. One of the purposes of cross-validation is to test the performance of the model using new data that has not been used to train the model in order to reduce problems such as overfitting or selection bias. The cross-validation is, for example, K-fold cross-validation, holdout validation, or leave-one-out cross-validation (LOOC).

Figure 8A:
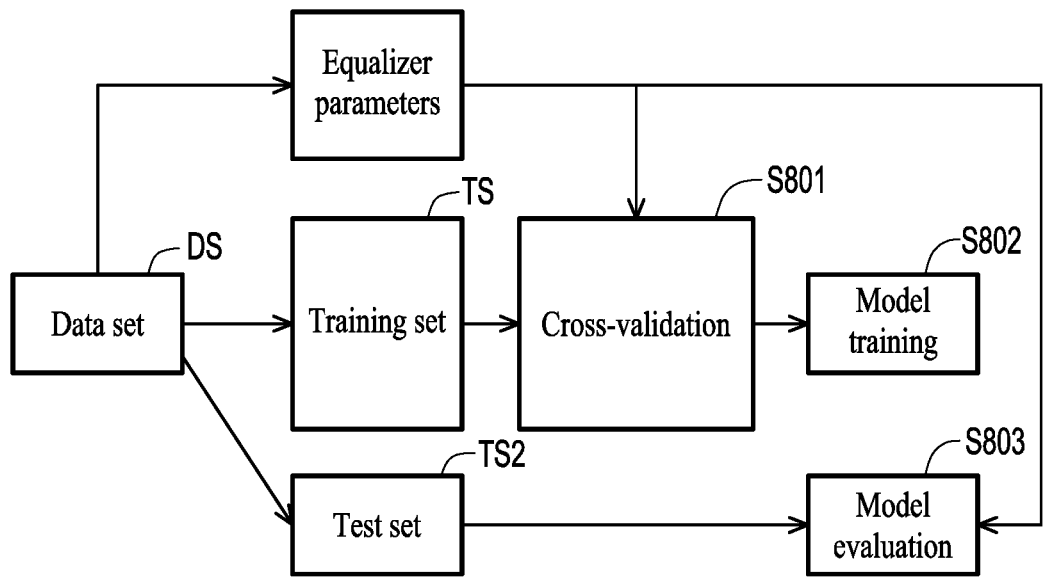
FIG. 8A is a schematic diagram of data set allocation according to an embodiment of the disclosure.

For example, FIG. 8A is a schematic diagram of data set allocation according to an embodiment of the disclosure. Please refer to FIG. 8A. The processor 120 may use multiple data sets DS as a training set TS and a test set TS2 respectively.

Figure 8B:
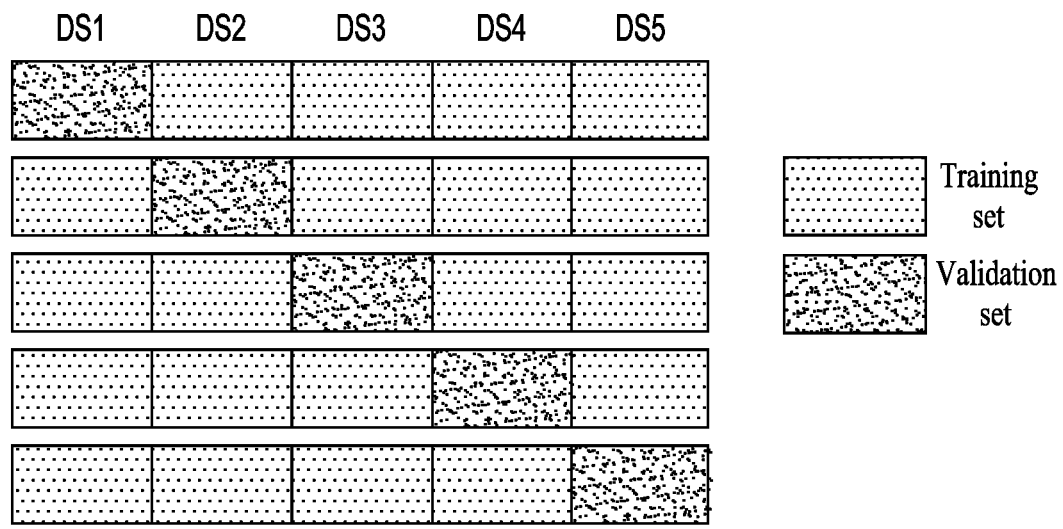
FIG. 8B is a schematic diagram of cross-validation according to an embodiment of the disclosure.

FIG. 8B is a schematic diagram of cross-validation (Step S801) according to an embodiment of the disclosure. Please refer to FIG. 8A and FIG. 8B. Taking K-fold cross-validation as an example, each column represents a stage. In the first stage, a data set DS1 (including individual equalizer parameters) in the original training set TS is used as the training set, and other data sets DS2~DS5 (including individual equalizer parameters) in the original training set TS are used as the validation set, and perform parameter inference model training accordingly (Step S802). In the second phase, the data set DS2 (including individual equalizers) in the original training set TS is used as a training set, and other data sets DS1 and DS3 to DS5 (including individual equalizer parameters) in the original training set TS are used as validation set, and perform parameter inference model training accordingly (Step S802). In the third stage, the data set DS3 (including individual equalizer parameters) in the original training set TS is used as the training set, and other data sets DS1, DS2, DS4, DS5 in the original training set TS (including individual equalizer parameters) as a validation set, and perform parameter inference model training accordingly (Step S802). The rest may be deduced in the same way, and will not be repeated here. The average of the errors obtained in all stages may be used as the error reference for model training. Next, the test set TS2 may be used to evaluate the trained parameter inference model (Step S803).

In summary, in the embodiment of the disclosure, the neural network model can be used to detect the multiple turning points of the smoothed response curve of the sound signal, so as to determine the equalizer parameters according to the frequency difference between the multiple turning points and the target frequency response curve. In this way, by automatically generating and applying the equalizer parameters, the audio distortion caused by the mechanical design of the speaker device can be compensated to improve the audio quality. In addition, in the embodiment of the disclosure, suitable equalizer parameters can be determined for sound signals of the same music genre.

Although the disclosure has been disclosed above with the embodiments, the embodiments are not intended to limit the disclosure. Persons with ordinary knowledge in the technical field may make some changes and modifications without departing from the spirit and scope of the disclosure. The scope of protection of the disclosure should be defined by the appended claims.

What is claimed is:

1. An audio parameter setting method, comprising:
   obtaining a sound signal played by a speaker device;
   generating a frequency response curve of the sound signal;
   smoothing the frequency response curve of the sound signal to obtain a smoothed response curve of the sound signal;
   determining a target frequency response curve according to the sound signal based on an application mode;
   detecting a plurality of turning points of the smoothed response curve of the sound signal by using a neural network model; and
   determining equalizer parameters according to the plurality of turning points of the smoothed response curve and the target frequency response curve.

2. The audio parameter setting method according to claim 1, wherein determining the target frequency response curve according to the sound signal based on the application mode comprises:
   setting a lower limit frequency and an upper limit frequency of the target frequency response curve;
   when the application mode is an audio adjustment mode, a high frequency part of the target frequency response curve is determined by using an average root mean square (RMS) power of the sound signal, and a low frequency part of the target frequency response curve is determined by using a low frequency part of another smoothed response curve of the sound signal; and
   when the application mode is a specific music mode, the target frequency response curve is determined by using the average RMS power of the sound signal.

3. The audio parameter setting method according to claim 1, wherein detecting the plurality of turning points of the smoothed response curve of the sound signal by using the neural network model comprises:
   calculating difference data between the smoothed response curve and the target frequency response curve; and
   inputting the difference data into the neural network model, so that the neural network model outputs a turning frequency of each of the plurality of turning points.

4. The audio parameter setting method according to claim 1, wherein the equalizer parameters comprises a plurality of center frequencies, the plurality of turning points respectively correspond to a plurality of turning frequencies, and determining the equalizer parameters according to the plurality of turning points of the smoothed response curve and the target frequency response curve comprises:
   obtaining a lowest center frequency among the plurality of center frequencies according to a lowest turning frequency among the plurality of turning frequencies; and
   setting a filtering status of the lowest center frequency as high-pass filtering.

5. The audio parameter setting method according to claim 1, wherein the equalizer parameters comprises a plurality of center frequencies, the plurality of turning points respectively correspond to a plurality of turning frequencies, and determining the equalizer parameters according to the plurality of turning points of the smoothed response curve and the target frequency response curve comprises:

calculating a plurality of power differences between the plurality of turning points of the smoothed response curve and the target frequency response curve;

selecting a plurality of first turning frequencies from the plurality of turning frequencies as the plurality of center frequencies according to comparison results of the plurality of power differences and frequency differences between the turning frequencies; and determining a plurality of relative powers respectively corresponding to the plurality of center frequencies according to the plurality of power differences corresponding to the plurality of first turning frequencies.

6. The audio parameter setting method according to claim 5, wherein determining the equalizer parameters according to the plurality of turning points of the smoothed response curve and the target frequency response curve further comprises:

generating a virtual equalizer parameter curve according to the plurality of center frequencies and the plurality of corresponding relative powers;

determining a plurality of angles corresponding to the plurality of center frequencies according to the virtual equalizer parameter curve; and determining a Q value corresponding to each of the plurality of center frequencies according to each of the plurality of angles.

7. The audio parameter setting method according to claim 1, wherein the sound signals comprise a plurality of first sound signals corresponding to a music genre, the equalizer parameters comprise a plurality of first equalizer parameters respectively corresponding to the plurality of first sound signals, and the method further comprises:

obtaining sound features of each of the plurality of first sound signals;

establishing a data set comprising the sound features of the plurality of first sound signals and the plurality of first equalizer parameters of the plurality of first sound signals; and establishing a parameter inference model by using the data set and a machine learning algorithm, wherein the parameter inference model is configured to determine optimized equalizer parameters for an input audio signal belonging to a music genre.

8. The audio parameter setting method according to claim 7, wherein the sound features of each of the plurality of first sound signals comprise at least one of a peak value, a maximum RMS power, a minimum RMS power, an average RMS power, and spectral characteristics.

9. The audio parameter setting method according to claim 7, wherein the data set comprises a first data subset and a second data subset, and establishing the parameter inference model by using the data set and the machine learning algorithm comprises:

in a first model training phase, using the first data subset as a training set and the second data subset as a validation set; and in a second model training phase, using the second data subset as the training set and the first data subset as the validation set.

10. An electronic device, comprising:

a storage device configured to store a plurality of modules; and a processor coupled to the storage device, accessing the plurality of modules and configured to:

obtain a sound signal played by a speaker device;

generate a frequency response curve of the sound signal;

smooth the frequency response curve of the sound signal to obtain a smoothed response curve of the sound signal;

determine a target frequency response curve according to the sound signal based on an application mode;

detect a plurality of turning points of the smoothed response curve of the sound signal by using a neural network model; and determine equalizer parameters according to the plurality of turning points of the smoothed response curve and the target frequency response curve.

11. The electronic device according to claim 10, wherein the processor is configured to:

set a lower limit frequency and an upper limit frequency of the target frequency response curve;

when the application mode is an audio adjustment mode, determine a high frequency part of the target frequency response curve by using an average root mean square (RMS) power of the sound signal, and determine a low frequency part of the target frequency response curve by using a low frequency part of another smoothed response curve of the sound signal; and when the application mode is a specific music mode, determine the target frequency response curve by using the average RMS power of the sound signal.

12. The electronic device according to claim 10, wherein the processor is configured to:

calculate difference data between the smoothed response curve and the target frequency response curve; and input the difference data into the neural network model, so that the neural network model outputs a turning frequency of each of the plurality of turning points.

13. The electronic device according to claim 10, wherein the processor is configured to:

obtain a lowest center frequency among the plurality of center frequencies according to a lowest turning frequency among the plurality of turning frequencies; and set a filtering status of the lowest center frequency as high-pass filtering.

14. The electronic device according to claim 10, wherein the equalizer parameters comprise a plurality of center frequencies, the plurality of turning points respectively correspond to a plurality of turning frequencies, and the processor is configured to:

calculate a plurality of power differences between the plurality of turning points of the smoothed response curve and the target frequency response curve;

select a plurality of first turning frequencies from the plurality of turning frequencies as the plurality of center frequencies according to comparison results of the plurality of power differences and frequency differences between the turning frequencies; and determine a plurality of relative powers respectively corresponding to the plurality of center frequencies according to the plurality of power differences corresponding to the plurality of first turning frequencies.

15. The electronic device according to claim 14, wherein the processor is configured to:

generate a virtual equalizer parameter curve according to the plurality of center frequencies and the plurality of corresponding relative powers;

determine a plurality of angles corresponding to the plurality of center frequencies according to the virtual equalizer parameter curve; and determine a Q value corresponding to each of the plurality of center frequencies according to each of the plurality of angles.

16. The electronic device according to claim 10, wherein the sound signals comprise a plurality of first sound signals corresponding to a music genre, the equalizer parameters comprise a plurality of first equalizer parameters respectively corresponding to the plurality of first sound signals, and the processor is configured to:
- obtain sound features of each of the plurality of first sound signals;
- establish a data set comprising the sound features of the plurality of first sound signals and the plurality of first equalizer parameters of the plurality of first sound signals; and
- establish a parameter inference model by using the data set and a machine learning algorithm, wherein the parameter inference model is configured to determine optimized equalizer parameters for an input audio signal belonging to a music genre.

\* \* \* \* \*